Oct. 27, 1964    E. C. ETTEMA ETAL    3,154,709
BRUSH HOLDER FOR A SMALL ELECTRIC MOTOR
Filed July 5, 1960

INVENTOR
EVERHARDUS C. ETTEMA
WIEGER VAN DIJK.
BY
AGENT

United States Patent Office 3,154,709
Patented Oct. 27, 1964

3,154,709
BRUSH HOLDER FOR A SMALL ELECTRIC MOTOR
Everhardus Catharinus Ettema and Wieger van Dijk, Drachten, Netherlands, assignors to North American Philips Company, Inc., New York, N.Y., a corporation of Delaware
Filed July 5, 1960, Ser. No. 40,632
Claims priority, application Netherlands July 15, 1959
3 Claims. (Cl. 310—246)

The invention relates to a low-power electric machine, particularly an electric motor for use in dry-shaving apparatus, in which a bearing or mounting plate for the brush holders having a flat commutator, the brushes being urged by springs in a direction at right angles to the commutator surface and is characterized in that the brushes are held in the holders with a large amount of play in the direction of rotation of the commutator and in a direction opposite thereto, the holders having on the lower side, in the direction of rotation of the commutator, guide lugs which project to the interior and which keep the brushes free of the walls and in that the torque exerted by the rotation of the commutator on the brushes is predominated by the torque exerted by the springs on the brushes.

The aforesaid measures ensure in the first place that the brushes always engage the commutator surface in a flat position. Thus tolerances in the brush shape are more readily compensated. Moreover, the tolerances of the brush holders and in mounting of the mounting plate are less critical. The brushes are furthermore displaced in the direction of rotation by the friction with the commutator, so that they abut against the guide lugs projecting inwardly. Owing to this friction a torque is produced, which tends to tilt the brush to the rear, which is counteracted by the torque produced by the spring pressure. Thus providing an improved contact between the brushes and the commutator.

It should furthermore be considered that on the side where the commutator lamination interrupts the contact with the brush, the brush is subjected to a greater wear owing to sparks; this can also be corrected by the spring pressure, since the brush is adapted to tilt about the guide lug also in the opposite direction.

The invention will be described by way of example with reference to the diagrammatical figures.

Figure 1:
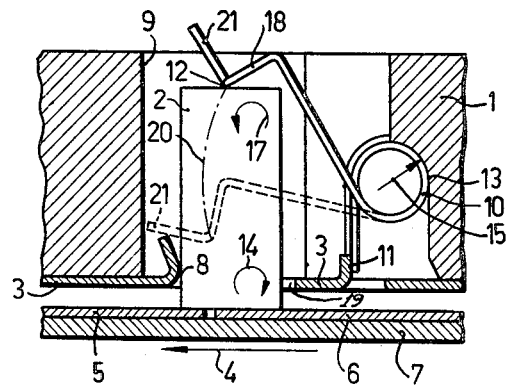
Figure 2:
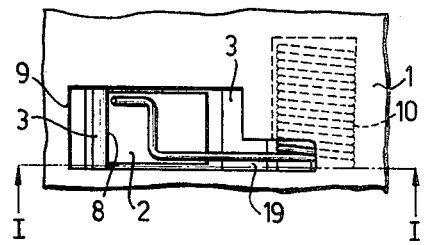
Figure 3:
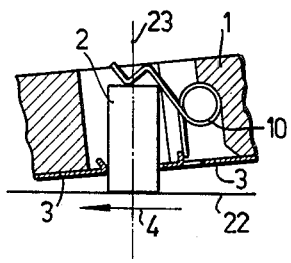
Figure 4:
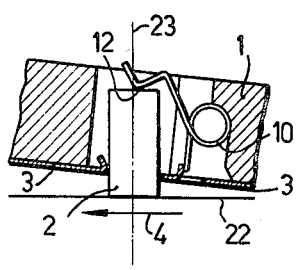
Figure 5:
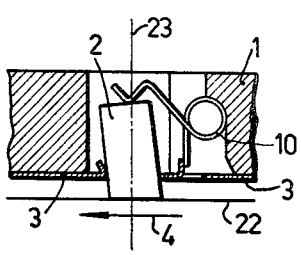

FIG. 1 is a cross sectional view and
FIG. 2 is a plan view.
FIGS. 3, 4 and 5 illustrate different brush positions.

FIGS. 1 and 2 show a portion of the mounting plate 1, in which one of the brushes 2 is provided. The brush guide 3 has a large amount of play in the direction of rotation 4 of the commutator with the segments 5 and 6 on the insulating disc 7 and is provided on the lower side with a guide lug 8, projecting inwardly in the direction of rotation 4, this guide lug keeping the brush clear of the wall 9. The guide lug 8 is preferably rounded off, so that the brush can tilt more readily.

A helical spring with pressure points 11 and 12 is centered accurately in a cavity 13 of the bearing plate 1, in the direction of the arrow 15 and urges the brush through a slot 19 in guide 3 onto the commutator. The rotating commutator exerts a torque 14 on the brush 2. Since the torque 14 is predominated by the counteracting torque 17, produced by the spring on the brush, the brush always engages the commutator surface in a flat position.

The pressure point 12 of the pressure arm 18 of the spring 10 is preferably displaced in the direction of rotation 4 of the commutator with respect to a line at right angles to the commutator surface and going through the centre of the effective brush surface, which contributes to the predomination of the torque 17 over the torque 14. When the brush wears out, the pressure point 12 describes the curve 20. When the brush has been substantially worn, the part 21 of pressure arm 18 bears on the upper edge of the guide lug 8, as is shown in broken lines in FIG. 1, so that the commutator can never be damaged by the arm.

It is evident from FIGS. 3 and 4 that the brush 2 adjusts itself always in a flat position on the commutator 22 even, when the mounting plate is mounted in oblique position (shown on an exaggerated scale) with respect to the commutator 22.

In FIG. 4 the pressure point 12 is located on the right-hand side of the perpendicular 23, but as wear of the brush increases, the pressure point 12 shifts to the left-hand side of the line 23.

FIG. 1 illustrates that in spite of the wear of the brush owing to sparks produced on the left-hand side of the brush, this brush remains in a flat position on the commutator.

What is claimed is:

1. In a low power miniature electric motor the combination comprising a commutator disc, a mounting plate having a brush guide member, a brush loosely fitting within said member and resilient means urging said brush in a direction perpendicular to the collector surface, said brush guide member having lug means projecting inwardly toward said brush to prevent contact between the brush holder wall and said brush and providing a pivot about which said brush is free to rotate within said holder, said lug and the force of friction acting on said brush create a moment acting on said brush in one direction, said resilient means having offset contact with said brush for urging said brush against said commutator and applying an offset force on said brush to produce a moment opposing said one couple acting on said brush.

2. In the combination according to claim 1 said resilient means having a projecting arm associated therewith to engage said lug to prevent contact between said commutator and said resilient means.

3. The combination according to claim 2 wherein said resilient means comprises a helically wound spring wire defining a cylinder journalled in a cavity in said bearing plate adjacent said brush holder, said cylindrical spring being retained in position in said cavity by the forces produced at the pressure points of said spring.

References Cited in the file of this patent
UNITED STATES PATENTS

| 1,736,844 | Buchenberg | Nov. 26, 1929 |
| 2,532,827 | Thomas | Dec. 5, 1950 |

FOREIGN PATENTS

| 694,097 | France | Sept. 9, 1930 |
| 369,366 | Great Britain | Mar. 24, 1932 |
| 153,587 | Switzerland | June 16, 1932 |

OTHER REFERENCES
Riggs, N. C.: Hancocks Applied Mechanics for Engineers, pp. 71 and 83; MacMillan Co. New York, 1920.

UNITED STATES PATENT OFFICE
CERTIFICATE OF CORRECTION

Patent No. 3,154,709 October 27, 1964

Everhardus Catharinus Ettema et al.

It is hereby certified that error appears in the above numbered patent requiring correction and that the said Letters Patent should read as corrected below.

Column 2, line 41, for "couple" read -- moment --.

Signed and sealed this 27th day of July 1965.

(SEAL)
Attest:

ERNEST W. SWIDER
Attesting Officer

EDWARD J. BRENNER
Commissioner of Patents